(12) United States Patent
Duhme et al.

(10) Patent No.: US 12,320,489 B2
(45) Date of Patent: Jun. 3, 2025

(54) LIGHTING DEVICE FOR A VEHICLE

(71) Applicant: HELLA GMBH & CO. KGAA, Lippstadt (DE)

(72) Inventors: David Duhme, Lippstadt (DE); Stefan Gröne, Brakel (DE); Carsten Hohmann, Warstein (DE); Alfons Michaelis, Borchen (DE); Martin Mügge, Geseke (DE); Martin Vollmer, Anröchte (DE)

(73) Assignee: HELLA GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 18/585,273

(22) Filed: Feb. 23, 2024

(65) Prior Publication Data
US 2024/0280238 A1 Aug. 22, 2024

Related U.S. Application Data

(63) Continuation of application No. PCT/EP2022/072893, filed on Aug. 17, 2022.

(30) Foreign Application Priority Data

Aug. 27, 2021 (DE) .............. 102021122264

(51) Int. Cl.
*F21S 43/00* (2018.01)
*B60Q 1/50* (2006.01)
(Continued)

(52) U.S. Cl.
CPC .......... *F21S 43/601* (2024.05); *B60Q 1/5035* (2022.05); *F21S 43/14* (2018.01);
(Continued)

(58) Field of Classification Search
CPC ...... F21S 43/14; F21S 43/15; F21S 43/26241; F21S 43/601; B60Q 1/5035;
(Continued)

(56) References Cited

U.S. PATENT DOCUMENTS

2003/0202357 A1* 10/2003 Strazzanti .......... C09K 19/0208
362/509
2008/0174730 A1 7/2008 Lee et al.

FOREIGN PATENT DOCUMENTS

CN 109291850 A 2/2019
DE 102015116382 A1 3/2017
(Continued)

OTHER PUBLICATIONS

International Search Report of the European Patent Office for application No. PCT/EP2022/072893, mailed Dec. 5, 2022 (6 pages).

*Primary Examiner* — Thomas M Sember
(74) *Attorney, Agent, or Firm* — WARNER NORCROSS + JUDD LLP

(57) ABSTRACT

Lighting device for a vehicle, comprising a lighting module having at least one light source and one luminous surface which is illuminated by the light source, from which light emanates during operation of the lighting device, as well as a liquid crystal display which is arranged at least partially in front of the luminous surface in such a way that, during operation of the lighting device, at least one portion of the light emerging from the luminous surface enters an entrance surface of the liquid crystal display and emerges from an exit surface of the liquid crystal display, wherein the lighting device is configured to control the liquid crystal display, in a targeted manner, in order to allow portions of the light impinging on the entrance surface to pass through the liquid crystal display and not to allow other portions of the light (Continued)

impinging on the entrance surface to pass through the liquid crystal display.

14 Claims, 4 Drawing Sheets

(51) Int. Cl.
- *F21S 43/14* (2018.01)
- *F21S 43/15* (2018.01)
- *F21S 43/20* (2018.01)
- *F21Y 105/18* (2016.01)
- *F21Y 113/13* (2016.01)
- *F21Y 115/10* (2016.01)

(52) U.S. Cl.
CPC ......... *F21S 43/15* (2018.01); *F21S 43/26241* (2024.05); *B60Q 2400/10* (2013.01); *B60Q 2400/20* (2013.01); *F21Y 2105/18* (2016.08); *F21Y 2113/13* (2016.08); *F21Y 2115/10* (2016.08)

(58) Field of Classification Search
CPC ............ B60Q 2400/10; B60Q 2400/20; F21Y 2105/18; F21Y 2113/13; F21Y 2115/10
See application file for complete search history.

(56) References Cited

FOREIGN PATENT DOCUMENTS

| | | |
|---|---|---|
| DE | 102016201084 A1 | 7/2017 |
| DE | 102019213247 A1 | 3/2021 |
| EP | 2815920 A1 | 12/2014 |
| EP | 3560757 A1 | 10/2019 |
| EP | 3597987 A1 | 1/2020 |
| JP | S6255803 A | 3/1987 |

\* cited by examiner

LIGHTING DEVICE FOR A VEHICLE

CROSS-REFERENCE TO RELATED APPLICATIONS

This application is a continuation of PCT/EP2022/072893 filed Aug. 17, 2022, which claims priority to German Patent Application 10-2021-122-264.8, filed Aug. 27, 2021, the disclosures of which are hereby incorporated by reference in their entirety.

BACKGROUND OF THE INVENTION

The present invention relates to a lighting device for a vehicle.

A lighting device of the aforementioned type is known from DE-10-2019-128-342 A1. The lighting device described therein is configured as a signal light, for example in the front area of the vehicle. One of the embodiments described in DE-10-2019-128-342 A1 comprises a lighting module surrounded by a housing, which lighting module comprises two light sources in the form of light-emitting diodes and a light conductor into which the light from the light-emitting diodes is coupled. The lighting module further comprises a luminous surface, which is configured as the lens of the housing. A liquid crystal display is arranged between the light conductor and the lens, through which liquid crystal display the light decoupled from the light conductor passes before it hits the illuminated panel in order to selectively block out portions of the light. The liquid crystal display is configured as an active liquid crystal display with two polarizers.

On the one hand, the configuration of the liquid crystal display as an active liquid crystal display is disadvantageous inasmuch as high light losses occur when the light passes through the liquid crystal display due to the active components of the liquid crystal display and the polarizers. The integration of the liquid crystal display into the housing of the lighting module is moreover disadvantageous inasmuch as it makes the construction of the lighting module more complicated and cost-intensive.

Design has always been an important aspect in the signaling functions of a vehicle, such as taillights, brake lights, direction indicators or daytime running lights, in rear lights and headlights. The importance of design for signaling functions has become even greater with the introduction of LED technology inasmuch as small light-emitting diodes, which are often used in larger numbers, can be used much more flexibly as illuminants for a signaling function than individual large light bulbs. Light-emitting diodes, in conjunction with the selected optical system, moreover, offer a wide range of design options.

A variation on LED technology can be found in the form of organic light-emitting diodes or OLED technology, in which the illuminant is not small and point-shaped like a light-emitting diode, but rather can be configured to be larger and more planar. This allows a luminous surface to be formed that is illuminated in an extremely homogeneous manner. One disadvantage of OLED technology in comparison to LED technology is that the costs of OLEDs are very high due to very complex manufacturing processes. These high costs are caused, in particular, by the different shapes required by the design and the low number of units. The special, high functional requirements in the automotive sector, such as with regard to the temperature range of −40° C. to +85° C. or +100° C., UV exposure and the effects of vibrations, shocks, and shaking, are more critical for an OLED than for a standard light-emitting diode.

This leads to the search for alternative possibilities to realize a similar design as with OLED elements, in particular a homogeneously illuminated surface and a switching of individual segments of the homogeneously illuminated surface.

SUMMARY OF THE INVENTION

The task underlying the present invention is therefore to provide a lighting device of the type mentioned at the beginning, which enables the switchable segmentation of an illuminated surface by simple means and/or at low cost.

It is provided that the liquid crystal display is arranged at least partially in front of the luminous surface in such a way that, during operation of the lighting device, at least one portion of the light emerging from the luminous surface enters an entrance surface of the liquid crystal display and emerges from an exit surface of the liquid crystal display, wherein the lighting device is configured such that the liquid crystal display is controlled, in a targeted manner, in order to allow portions of the light impinging on the entrance surface to selectively pass through the liquid crystal display and not to allow other portions of the light impinging on the entrance surface to pass through the liquid crystal display. By arranging the liquid crystal display in the direction of propagation of the light behind the illuminating surface, the lighting device can be configured more simply and cost-effectively.

The possibility exists that the lighting module is a separate lighting module, wherein the liquid crystal display can be detachably mounted or is mounted to the lighting module, or wherein the liquid crystal display can be positioned or is positioned at a distance in front of the lighting module. Pre-assembled lighting modules, which are used in large quantities in the automotive industry and are correspondingly cost-effective, can be used because of this configuration.

It can be provided that the liquid crystal display is a passive liquid crystal display. Small surfaces are generally used for an automotive lighting function, from which small surface a high light output or high brightness must be realized. A higher degree of transmission of the liquid crystal display is therefore important in order to generate the legally required luminous intensity of a signaling function. In contrast to an active liquid crystal display, a passive liquid crystal display has no active components like transistors, such that the degree of transmission of the passive liquid crystal display is significantly higher than that of an active liquid crystal display. A passive liquid crystal display can, moreover, be manufactured much more cost-effectively than an active liquid crystal display.

It can be provided that the liquid crystal display is a guest-host display or a smartglass display. With such a liquid crystal display, no polarization filters are required, so that a higher degree of transmission is available, which is advantageous and decisive for the fulfillment of a lighting function with a small lighting element. Furthermore, the liquid crystal display is also independent of the viewing angle due to the omission of polarizers.

The possibility exists for the liquid crystal display to be a liquid crystal display doped with color pigments. In particular, the liquid crystal display can be a so-called dye-doped display, which is doped with color pigments that determine the color of the liquid crystal display when it is not in operation. This means that, for example, a black surface can be visible, as well as also a red or blue surface or a surface in any other desired color.

It can be provided that the liquid crystal display comprises a plurality of segments that can be controlled independently of each other. The independently controllable segments of the liquid crystal display can be different from each other in terms of their size and/or shape. An advantage of a passive liquid crystal display is that the pixelation of the liquid crystal display can be configured as required. This means that the separately switchable pixels of the liquid crystal display can be given any desired, different shape and size and thus actively define the desired design of a switchable matrix for the light function. By way of example, triangular, diamond-shaped, square or any other shape of pixel can be specified and implemented, or even special graphic elements such as letters, pictograms or logos. In contrast to active liquid crystal displays with very small pixelation for high resolutions, passive liquid crystal displays, especially passive liquid crystal displays for automotive applications, generally have larger pixel areas.

The possibility exists that the liquid crystal display is only arranged in front of a section of the luminous surface, so that during operation of the lighting device only portions of the light emitted by the luminous surface enter the entrance surface of the liquid crystal display, whereas other portions of the light emitted by the luminous surface propagate past the liquid crystal display. That which proves to be advantageous when the luminous surface of the lighting module is partially covered by the liquid crystal display is that a partial area of the luminous surface of the lighting module can always emit light freely and thus provide an uninfluenced emission of light, at the same time the partial area with the display coverage can however be used to switch and illuminate different signatures.

It can be provided that the luminous surface of the lighting module and/or the exit surface of the liquid crystal display has/have a shape that differs from a rectangular shape. By way of example, the luminous surface of the lighting module can have a vehicle-specific contour and shape for a desired appearance. The liquid crystal display mounted in front can, moreover, take up the shape of the luminous surface of the lighting module and have exactly the same shape or deliberately deviate from the shape of the luminous surface of the lighting module, such as, for example, by only partially covering the luminous surface of the lighting module in order to ensure a functional design of a lighting function.

The possibility exists that the lighting device is set up to fulfill a signaling function, in particular the function of a taillight or a tail stop light or a tail indicator light or a position daytime running light or a position flashing light.

It may be provided that the lighting device comprises a plurality of lighting modules and a plurality of liquid crystal displays, wherein at least one of the liquid crystal displays is respectively assigned to one of the lighting modules in such a way that during operation of the lighting device at least one portion of the light emerging from the luminous surface enters the entrance surface of the assigned liquid crystal display. In particular, the lighting modules then form a common signaling function together with the liquid crystal displays. By way of example, the lighting modules can individually be switched on and off or the brightness can be changed along a dimming curve when switching on and off. Together with the liquid crystal displays, different light signatures can be displayed. Examples of this in different driving situations are: a tail light when driving, a tail light when stationary or in a traffic jam with reduced brightness and glare for the driver behind, a parking light in which a greatly reduced number of pixels is provided, or, for example, only one outer lighting module lights up, in particular with a reduced number of pixels, a brake light when driving, a brake light when stationary, emergency braking, a conventional flashing light, a sequential flashing light or a hazard warning light. Further examples in different circumstances are: a tail light when driving in the city, which is operated in particular with reduced luminance, a tail light when driving on a country road or a highway, which is operated with higher luminance, a welcome and goodbye animation, a display of information such as the charge level display of the battery of an electric vehicle, in which figures are displayed as percentages, personalization, and individualization such as the display of names that can be provided by software, for example, for the activation, or hazard warnings that show, the indication of the formation of an emergency access way in a traffic jam.

The possibility exists that the at least one light source of the lighting module is configured as a light-emitting diode, wherein, in particular, a plurality of light-emitting diodes are provided. At least two of the light-emitting diodes can generate light with colors different from each other when the lighting device is in operation. This makes it easy to create an attractive design for the signaling function of the lighting device. The lighting modules can be implemented in all colors, such as red, yellow, white, blue, cyan or similar by means of an equipment with variable LEDs. If a blue color is used, the lighting modules are also suitable for the design and layout of warning lights for police vehicles. Two-color variants are also possible with an equipment with corresponding LEDs, such as red-yellow, yellow-white or white-cyan.

This makes it possible to use such lighting modules in many areas of the vehicle, in addition to a rear light also in the headlight or alternatively at the front of the vehicle as well as also at any location in the vehicle interior thanks to the flat design of the lighting module.

The possibility exists that the lighting module comprises a light conductor which conducts the light emitted by the light source to the luminous surface. It may, moreover, be provided that the lighting module comprises a diffusing structure, in particular, at least one diffusing lens, preferably wherein, during operation of the lighting device, the diffusing structure diffuses the light moving through the light conductor in such a way that the luminous surface is homogeneously illuminated, in particular, wherein, at the same time, a sufficient focusing of the light in the forward direction is achieved.

BRIEF DESCRIPTION OF THE DRAWINGS

The invention is elucidated in more detail below with reference to the accompanying drawings. Wherein.

Identical and functionally identical parts are provided with identical reference signs in the figures.

DETAILED DESCRIPTION OF THE CURRENT EMBODIMENT

Figure 1:
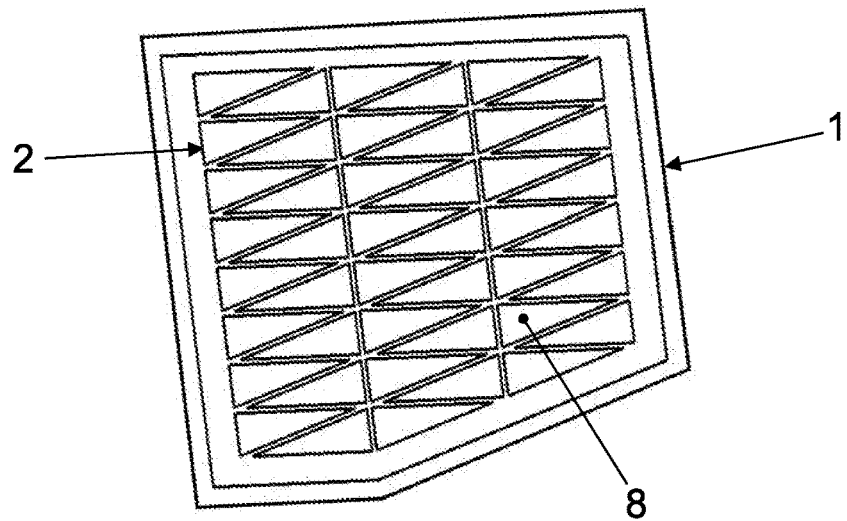
FIG. 1 shows a front view of a first embodiment of a lighting device according to the invention.
Figure 2:
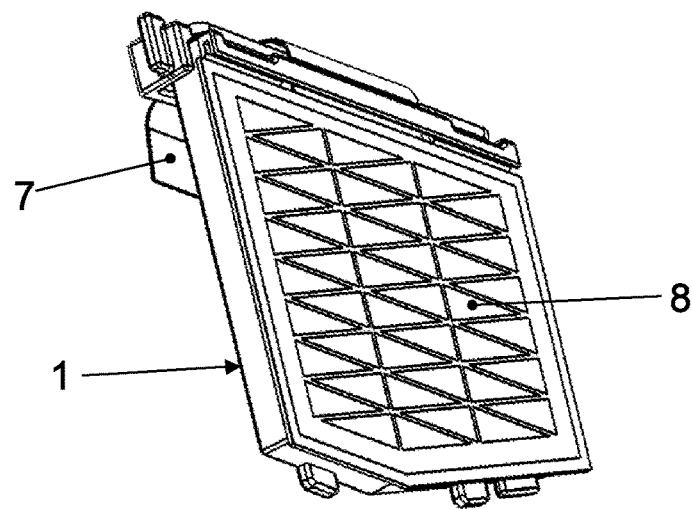
FIG. 2 shows a perspective view of the embodiment according to FIG. 1.
Figure 3:
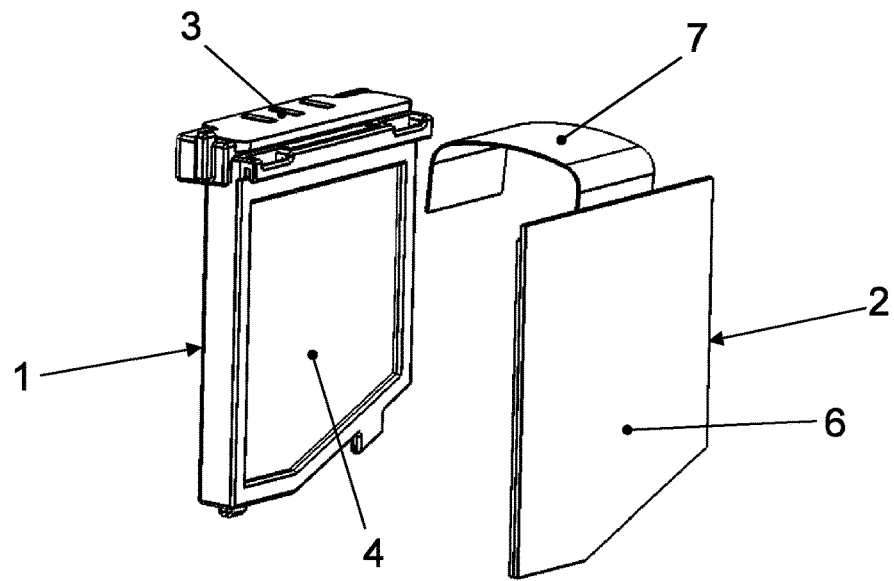
FIG. 3 shows a perspective view of the embodiment according to FIG. 1 in a not yet assembled state.
Figure 4:
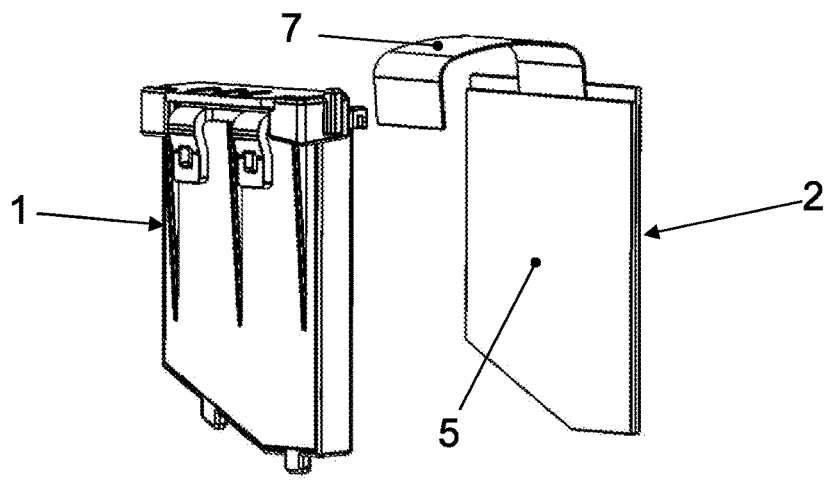
FIG. 4 shows a further perspective view of the embodiment according to FIG. 1 in a not yet assembled state.

The embodiment of a lighting device according to the invention illustrated, in particular, in FIG. 1 through FIG. 4 comprises a lighting module 1 and a liquid crystal display 2 connected to the lighting module 1.

The lighting module 1 has a light source 3, which is only indicated schematically and which comprises, in particular, one or a plurality of light-emitting diodes (LEDs). The lighting module 1 moreover has a light conductor, not shown, which is configured as a flat transparent plate, into which the light emitted by the light source 3 is coupled at the front. The light conductor conducts the light emitted by the light source to a luminous surface 4, from which the light emerges at least partially. The lighting module 1 has a diffusing structure, also not shown, mounted in front of the light conductor, in particular a diffusing lens, which diffuses the light moving through the light conductor during operation of the lighting device so that the luminous surface 4 is illuminated in a comparatively homogeneous manner. A reflective part, in particular an additional housing, is provided on the side of the light conductor facing away from the luminous surface 4, which additional housing reflects light forwards in the direction of the luminous surface 4.

The lighting module 1, which, in this way, is designed very flat, is configured as a so-called FlatLight module, which offers high performance with homogeneous illumination of the entire luminous surface 4 and any desired shape of the luminous surface 4. As with OLED elements, a plurality of these lighting modules can be positioned offset next to and behind each other when integrated into a combination rear light in order to create the desired individual appearance of the signaling function, for example a taillight or a tail/stop light.

The liquid crystal display 2 has an entrance surface 5 and an exit surface 6. The liquid crystal display 2 moreover has a flexible conductor path 7 which serves for contact, which, in the state where it is connected to the lighting module 1, overlaps the upper side of the lighting module 1 in FIG. 1 through FIG. 4. The flexible conductor path 7 is routed via the lighting module 1 to control electronics not shown.

The liquid crystal display 2 is arranged in front of the luminous surface 4 of the lighting module 1 in such a way that, during operation of the lighting device, at least one portion of the light emerging from the luminous surface 4 enters the entrance surface 5 of the liquid crystal display 2 and emerges from the exit surface 6 of the liquid crystal display 2. The liquid crystal display 2 can be controlled in such a way that portions of the light impinging on the entrance surface 5 pass through the liquid crystal display 2 and other portions of the light impinging on the entrance surface 5 do not pass through the liquid crystal display 2.

In the embodiment example shown in FIG. 1 through FIG. 4, the liquid crystal display 2 substantially completely covers the luminous surface 4. The liquid crystal display 2 has individual segments 8 that can be controlled individually. In the embodiment example shown in FIG. 1 through FIG. 4, the segments 8 have a triangular outline.

Figure 5:
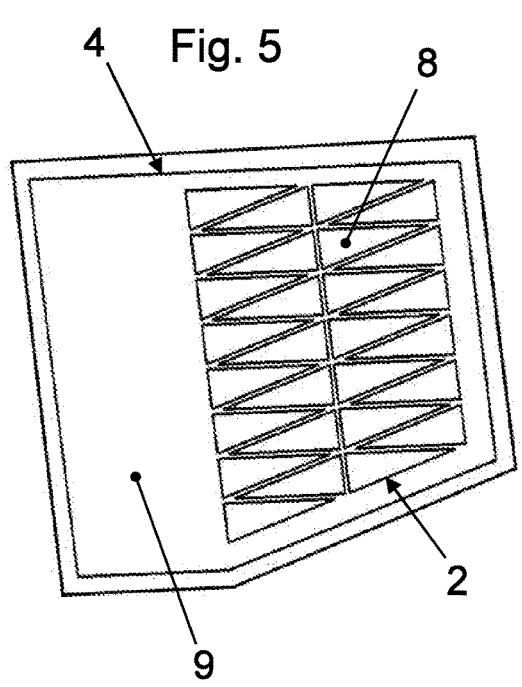
FIG. 5 shows a front view of a second embodiment of a lighting device according to the invention.
Figure 6:
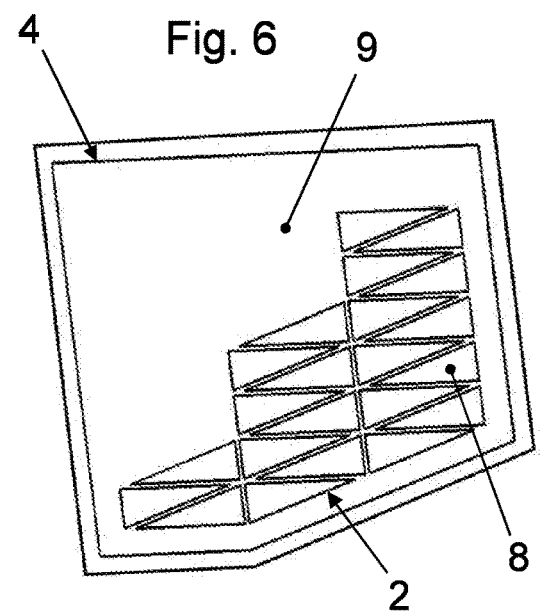
FIG. 6 shows a front view of a third embodiment of a lighting device according to the invention.

The embodiment examples according to FIG. 5 and FIG. 6 likewise comprise a liquid crystal display 2 with segments 8 with a triangular outline. However, in these embodiment examples, the liquid crystal display 2 does not completely cover the luminous surface 4, but rather leaves an area 9 of the luminous surface 4 free, from which free area light can emerge that can move past the liquid crystal display 2.

Figure 7:
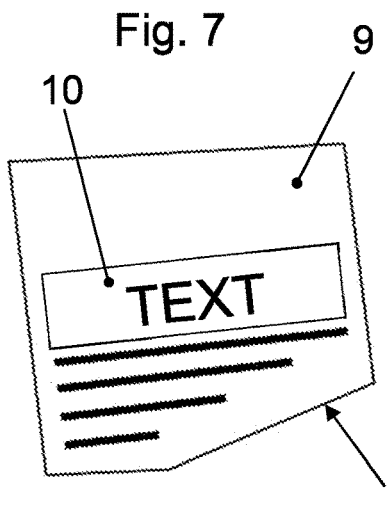
FIG. 7 shows a front view of a fourth embodiment of a lighting device according to the invention.
Figure 8:
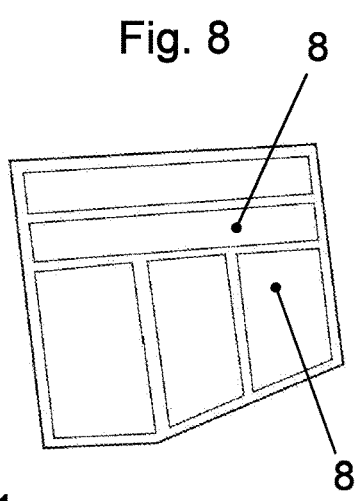
FIG. 8 shows a front view of a fifth embodiment of a lighting device according to the invention.
Figure 9:
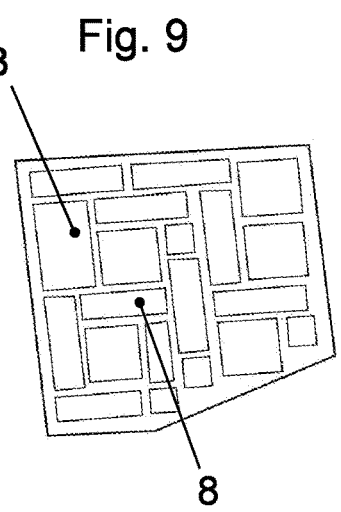
FIG. 9 shows a front view of a sixth embodiment of a lighting device according to the invention.

The embodiment examples according to FIG. 7 through FIG. 9 comprise a liquid crystal display 2 with segments 8, some of which have a rectangular outline and some of which have an outline that differs from a rectangle and a triangle. The size of the individual segments 8 in these embodiments is also partially different from each other. In the embodiment shown in FIG. 7, a partitioned segment 10 is, for example, provided, which can have the shape of a schematically illustrated text.

In the embodiment of a lighting device shown in FIG. 10 through FIG. 15, six lighting modules 1 with six liquid crystal displays 2 are arranged next to each other. The lighting device can, for example, be configured as a rear light in which one or a plurality of signaling functions, such as a taillight or a tail/stop light, are realized by the lighting modules 1 and the liquid crystal display 2.

Figure 10:
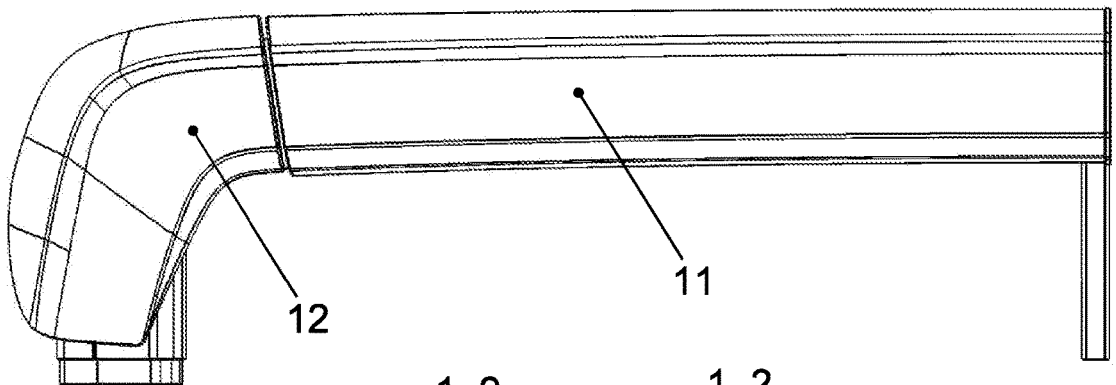
FIG. 10 shows a front view of a seventh embodiment of a lighting device according to the invention.
Figure 11:
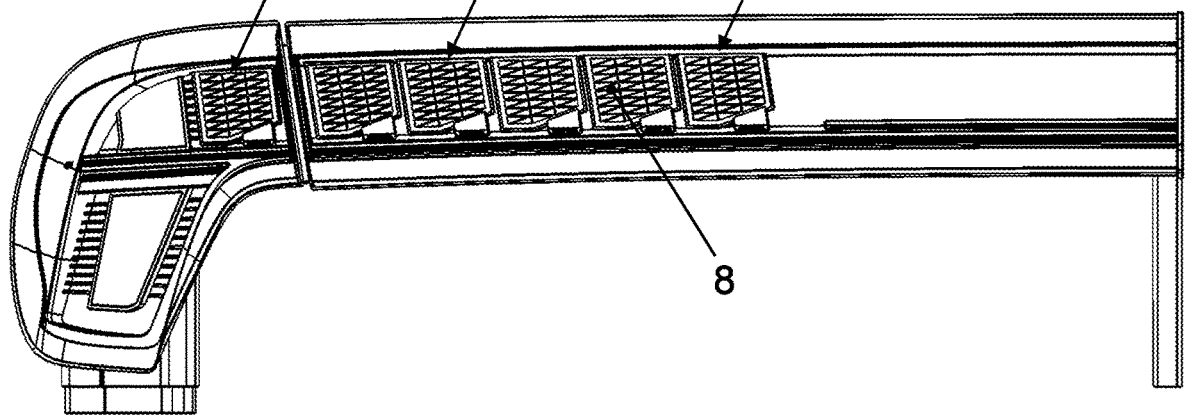
FIG. 11 shows a front view of the embodiment according to FIG. 10 without outside lenses.
Figure 12:
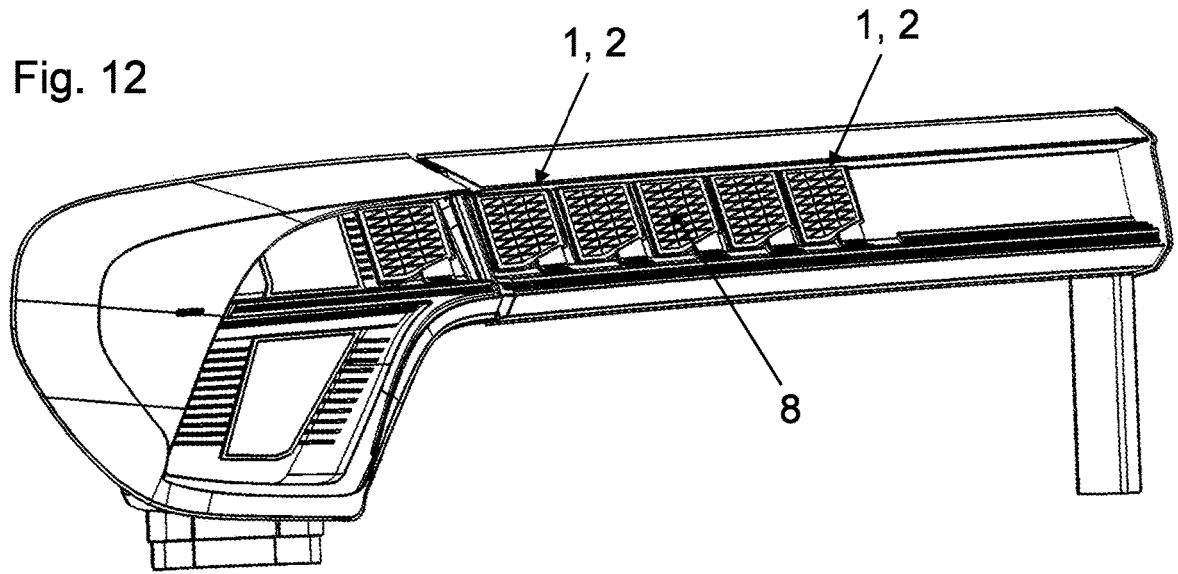
FIG. 12 shows a perspective view of the embodiment according to FIG. 10 without outside lenses.
Figure 13:
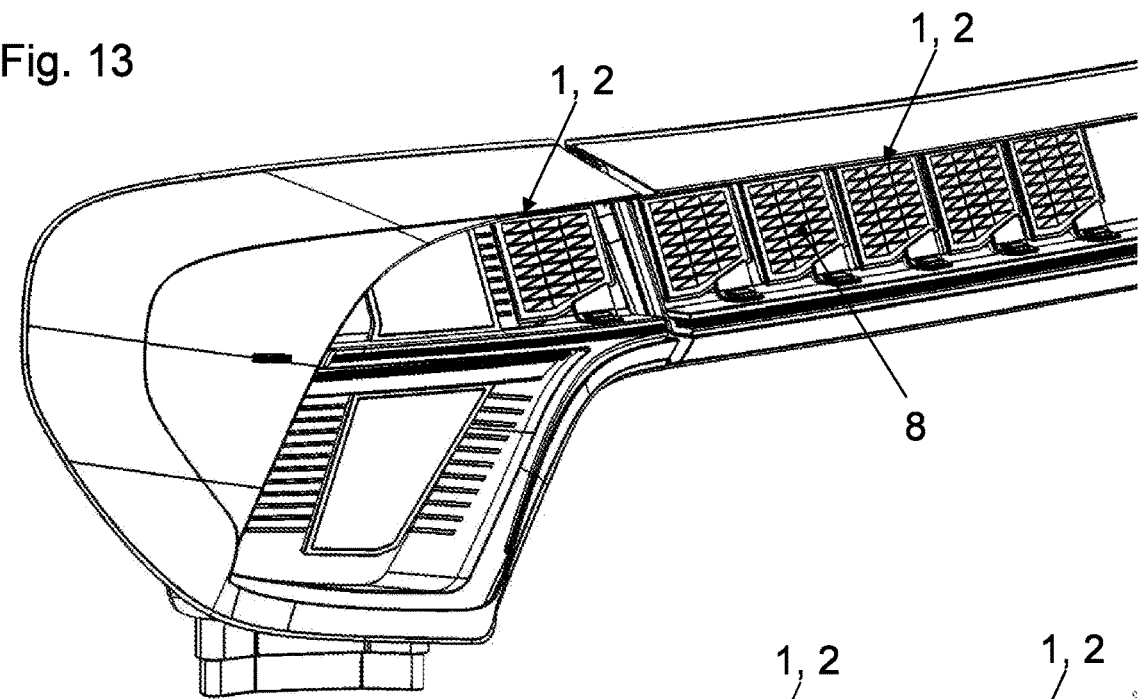
FIG. 13 shows a detail of the perspective view of the embodiment according to FIG. 10 without outside lenses.
Figure 14:
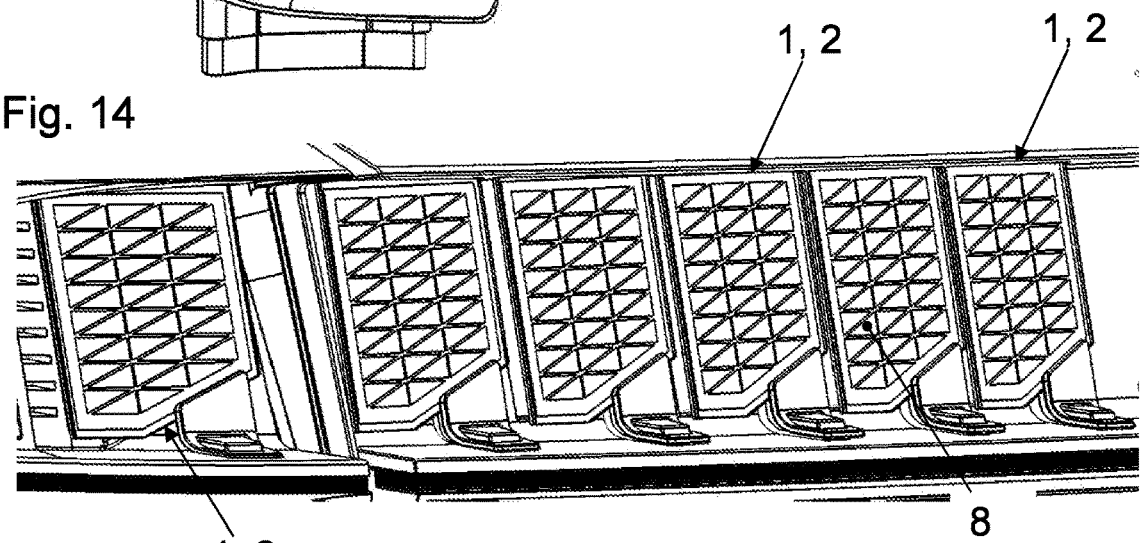
FIG. 14 shows a further detail of the perspective view of the embodiment according to FIG. 10 without outside lenses.
Figure 15:
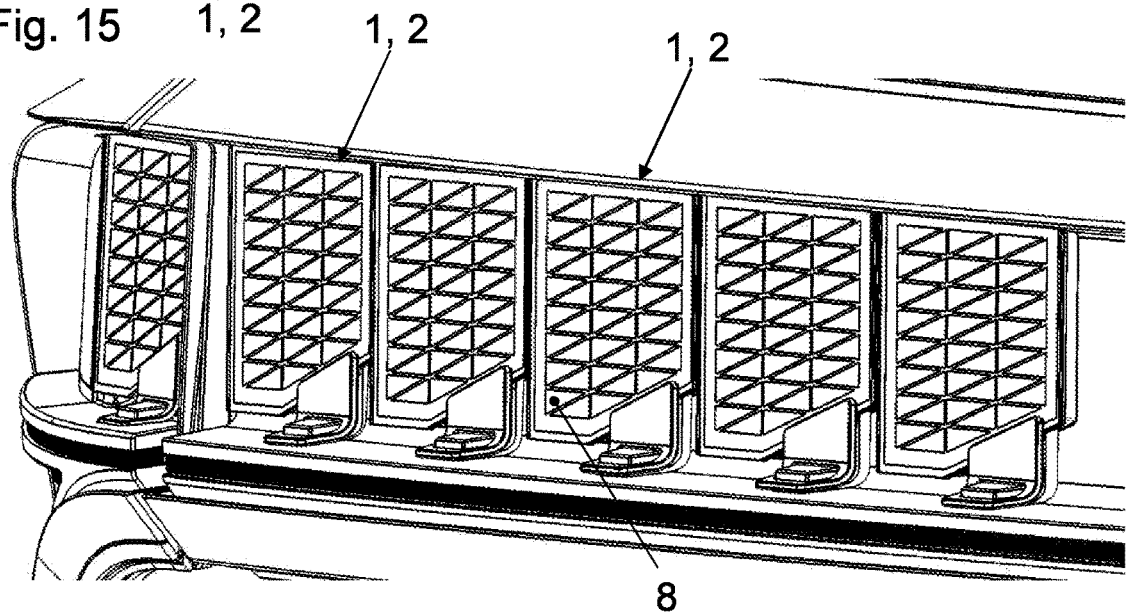
FIG. 15 shows a further detail of the perspective view of the embodiment according to FIG. 10 without outside lenses.

The lighting device comprises outside lenses 11, 12, which cover the liquid crystal displays 2 in the state shown in FIG. 10. A lighting module 1 with the liquid crystal display 2 arranged in front of it is installed in an outer, or alternatively in FIG. 11, in a left-hand portion of the rear light, whereas five further lighting modules 1 with the liquid crystal displays 2 arranged in front of them are installed next to each other in an inner, or alternatively in FIG. 11, in a right-hand portion of the rear light.

| List of reference signs: | |
|---|---|
| 11 | Lighting module |
| 12 | Liquid crystal display |
| 13 | Light source of the lighting module |
| 14 | Luminous surface of the lighting module |
| 15 | Entrance surface of the liquid crystal display |
| 16 | Exit surface of the liquid crystal display |
| 17 | Flexible conductor path of the liquid crystal display |
| 18 | Segment of the liquid crystal display |
| 19 | Uncovered area of the luminous surface of the lighting module |
| 20 | Partitioned segment of the liquid crystal display |
| 11, 12 | Outside lens |

The above description is that of current embodiments of the invention. Various alterations and changes can be made without departing from the spirit and broader aspects of the invention as defined in the appended claims, which are to be interpreted in accordance with the principles of patent law including the doctrine of equivalents. Any reference to elements in the singular, for example, using the articles "a," "an," "the," or "said," is not to be construed as limiting the element to the singular.

The invention claimed is:

1. A lighting device for a vehicle, comprising:
   a lighting module having at least one light source and one luminous surface illuminated by the light source, from which light emanates during operation of the lighting device,
   a liquid crystal display, wherein the liquid crystal display is a smartglass display, the liquid crystal display being arranged at least partially in front of the luminous surface in such a way that, during operation of the lighting device, at least one portion of the light emerging from the luminous surface enters an entrance surface of the liquid crystal display and emerges from an exit surface of the liquid crystal display,
   wherein the lighting device is configured to control the liquid crystal display, in a targeted manner and without a polarization filter, in order to allow portions of the light impinging on the entrance surface to pass through the liquid crystal display and not to allow other portions of the light impinging on the entrance surface to pass through the liquid crystal display.

2. The lighting device according to claim 1, wherein the lighting module is a separate lighting module, wherein the liquid crystal display is detachably mounted or is mounted to the lighting module, or wherein the liquid crystal display is positioned or is positioned at a distance in front of the lighting module.

3. The lighting device according to claim 1, wherein the liquid crystal display is a passive liquid crystal display.

4. The lighting device according to claim 1, wherein the liquid crystal display is a liquid crystal display doped with color pigments.

5. The lighting device according to claim 1, wherein the liquid crystal display comprises a plurality of segments that can be controlled independently of each other.

6. The lighting device according to claim 5, wherein the independently controllable segments of the liquid crystal display are different from each other in terms of their size and/or their shape.

7. The lighting device according to claim 1, wherein the liquid crystal display is only arranged in front of a section of the luminous surface, so that during operation of the lighting device only portions of the light emitted by the luminous surface enter the entrance surface of the liquid crystal display, whereas other portions of the light emitted by the luminous surface propagate past the liquid crystal display.

8. The lighting device according to claim 1, wherein the luminous surface of the lighting module and/or the exit surface of the liquid crystal display has/have a shape that differs from a rectangular shape.

9. The lighting device according to claim 1, wherein the lighting device comprises a plurality of lighting modules and a plurality of liquid crystal displays, wherein at least one of the liquid crystal displays is respectively assigned to one of the lighting modules in such a way that during operation of the lighting device, at least one portion of the light emerging from the luminous surface enters the entrance surface of the assigned liquid crystal display.

10. The lighting device according to claim 1, wherein the lighting device is set up to fulfill a signaling function of a taillight or a tail stop light or a tail indicator light or a position daytime running light or a position indicator light.

11. The lighting device according to claim 1, wherein the at least one light source of the lighting module is configured as a light-emitting diode, wherein a plurality of light-emitting diodes are provided.

12. The lighting device according to claim 11, wherein the at least two of the light emitting diodes generate light with colors different from each other when the lighting device is in operation.

13. The lighting device according to claim 1, wherein the light emitted by the light source is coupled to the luminous surface.

14. The lighting device according to claim 13, wherein the luminous surface is homogeneously illuminated.

* * * * *